July 27, 1943.  A. R. DOERING  2,325,179
MEASURING INSTRUMENT
Filed Oct. 11, 1939  2 Sheets-Sheet 1
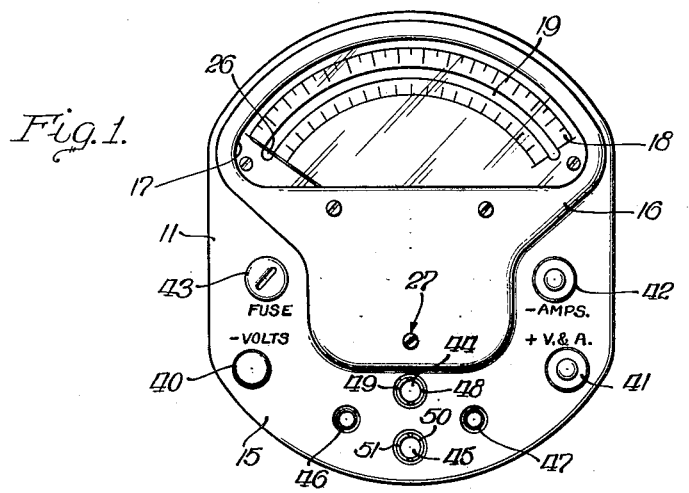
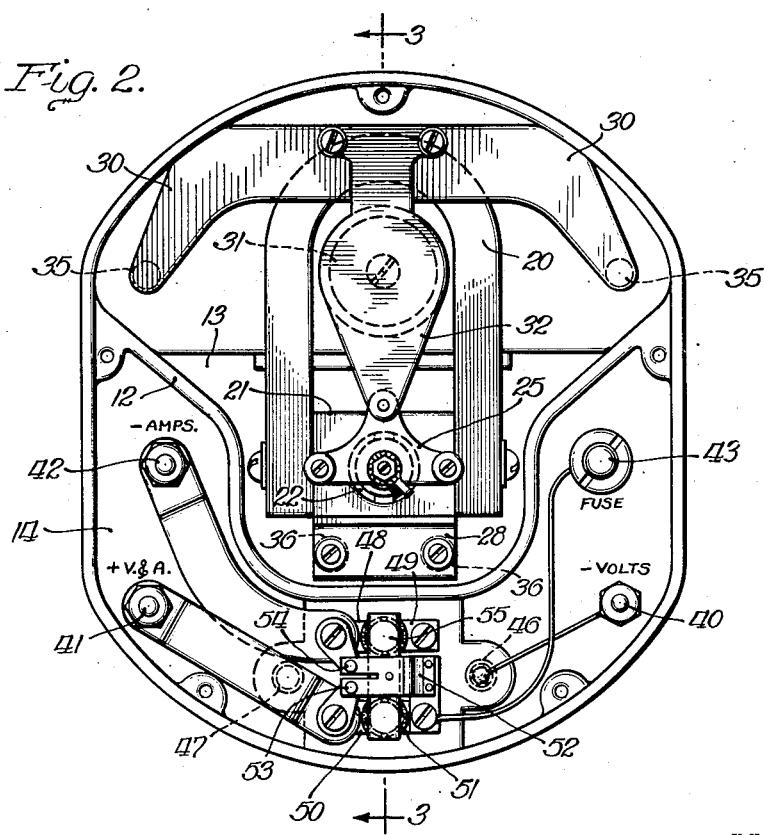
INVENTOR.
Arthur R. Doering
BY Richardson and Auer
ATTORNEYS.

July 27, 1943.   A. R. DOERING   2,325,179
MEASURING INSTRUMENT
Filed Oct. 11, 1939   2 Sheets-Sheet 2

INVENTOR.
Arthur R. Doering
BY Richardson and Auer
ATTORNEYS.

Patented July 27, 1943

2,325,179

UNITED STATES PATENT OFFICE 2,325,179

MEASURING INSTRUMENT

Arthur R. Doering, Chicago, Ill.

Application October 11, 1939, Serial No. 298,973

6 Claims. (Cl. 171—95)

This invention relates to electrical measuring instruments, and is particularly concerned with an improved universal volt-ammeter of the moving coil type.

The invention contemplates, among other improvements, means for protecting the moving coil against overload, comprising a relay normally disposed in a circuit connected in parallel with the moving coil and arranged to become energized when an overload occurs to actuate a contact for short-circuiting the moving coil. This relay also improves the damping effect of the instrument and corrects the thermal conditions thereof by correcting temperature differences. Other improvements relate to the provision of contact controlled means for normally maintaining a short circuit across certain conductors to condition the instrument for use as a voltmeter and replacing the short circuits by a shunt to condition the instrument for use as an ammeter. The shunt is made in the form of a plug adapted to operate contacts arranged within the instrument so as to remove the normal short circuit when the shunt plug is inserted. Each shunt plug is calibrated for a predetermined measuring range and several shunt plugs may be supplied with the instrument. One conductor provided in the circuit for measuring voltage is normally open and may be bridged by means of a plug resistance to condition the instrument for use as a voltmeter. This plug resistance is made similar to the plug constituting the shunt for measuring current, and each plug resistance is again calibrated for a predetermined voltage measuring range. As in the former case, several such plug resistances may be supplied with the instrument. The socket contacts for these plugs are built in the instrument.

The above noted features and other objects and features will appear from the following detailed description rendered with reference to the accompanying drawings, wherein Fig. 1 illustrates the face of the instrument;

Fig. 2 represents a view of the inside arrangement of parts after removal of the back plate;

Figure 4:
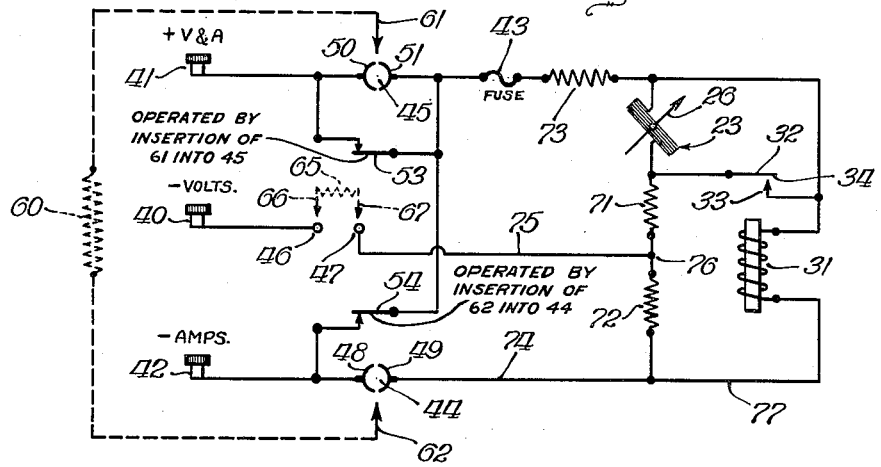
Fig. 4 is a diagrammatic circuit diagram showing the electrical connections between the various parts.

All the figures are more or less diagrammatic; they show only the salient parts, omitting details which are not essential for the invention and its understanding. The proportions are, for the sake of convenient representation and description, somewhat distorted in various instances. Like parts are designated by like reference numerals throughout the drawings. Elements and details which may be assumed to be well known and which are not essential will be described only to the extent required for explaining the invention.

Figure 3:
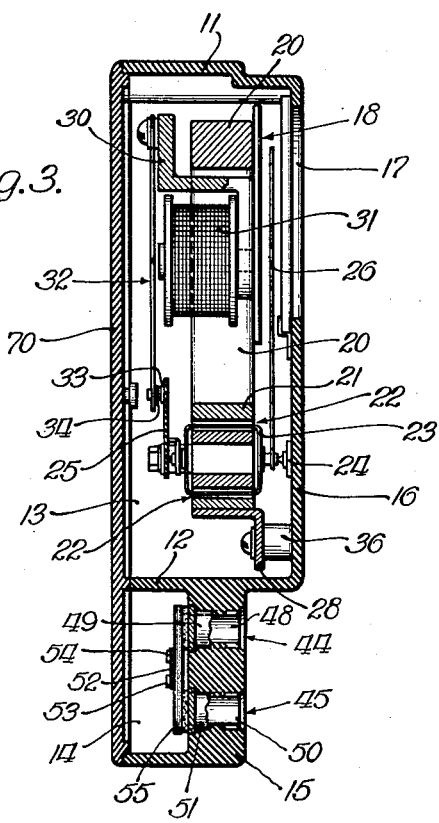
Fig. 3 illustrates a section through the instrument along the line 3—3 in Fig. 2.

The instrument comprises a housing 11 provided with an internal rib 12 which separates the housing into the compartments 13 and 14. The face of the compartment 13 is raised with respect to the face 15, as indicated in Figs. 1 and 3 at 16. A cutout 17, which may be covered by glass or other transparent material, is provided in the face 16. Within this cutout under the corresponding transparent cover is arranged the scale 18 which may be of the usual type and provided with differently calibrated measuring ranges on either side of the mirrored segment 19.

Within the compartment 13 is arranged the permanent magnet 20 which may be a U-shaped structure with a shoe 21 positioned between the poles, the shoe being provided with a circular gap 22 in which is arranged the moving coil 23. The coil may be journalled on pins, one provided in the journal plate 24 and the other in the bridge piece 25. The coil carries the indicator hand or finger 26 which may be of any suitable material, for example, glass. The adjustment and zero setting of the movable coil may be arranged on the face of the instrument (Fig. 1) at 27. The angle piece 28 carries the pole shoe 21 and also the magnet 20. Mounted between the legs of the magnet 20 on an angular member 30 is the relay coil 31. The core of this coil is mounted on an extension of the angular member 30, as indicated particularly in Fig. 3. The leaf spring 32 constitutes the armature of the coil 31. The spring is mounted on the member 30 and extends downwardly to a point opposite the end of the bridge member 25 which is provided with a contact 33, the end of the leaf spring also carrying a contact 34, as particularly shown in Fig. 3. This leaf spring armature 32 is made of thin magnetically sensitive sheet material so that the contacts 33—34 are maintained normally open by the weight of the leaf spring 32 when the instrument is placed in normal substantially horizontal or horizontally inclined operating position, with the face 16 pointing upwardly. Only a slight amount of excess current will be necessary for energizing the coil 31 to attract the leaf spring 32 and to close the contacts 33—34. The assembly is mounted within the instrument on suitable posts, such as 35 and 36. In the compartment 14 are arranged the contact provisions for coaction with the previously mentioned shunt plug, and also various leads and conductors which are best described jointly with reference to Figs. 1 and 2.

Mounted to project from the face of the instrument are the posts 40 (—volts), 41 (+V & A), 42 (—amps.), and 43 (fuse). Substantially along the center line of the instrument are the split socket contacts 44 and 45 for receiving the prongs of the shunt plug for conditioning the instrument for use as an ammeter, and the socket contacts 46—47 for receiving the prongs of the series resistance plug to be connected in the lead 75 (see also Fig. 4) for conditioning the instrument for use as a voltmeter. The split socket contact 44 comprises two conductor plates 48—49 which are normally not in electrical engagement, due to the gap between these contacts clearly shown in Fig. 1. However, when a metallic circular prong or plug is inserted, the gap between 48 and 49 will be bridged between these conductor plates. The split socket contact 45 is constructed similarly, comprising the contact plates 50 and 51 (see Figs. 1 and 2). The contact plate 51 carries a crimped contact spring 52 (see Fig. 2) having at its end two contacts 53 and 54 which are in electrical engagement with the plates 48 and 50, respectively, and also with the posts 42 and 41, respectively, as shown in the drawings. An insulating member 55 is placed in alignment with the split plug contacts 44 and 45 and underneath the contact spring 52.

Figure 5:
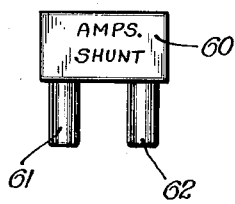
Figs. 5 and 6 show the shunt plug and the series resistance plug for conditioning the instrument for use as an ammeter and as a voltmeter, respectively.

The shunt plug may be constructed as shown in Fig. 5, comprising a shunt-carrying body 60 and two prongs 61 and 62. When this shunt with its prongs 61—62 is inserted into the contact sockets 44—45, the prongs 61—62 will engage the insulating member 55, exerting pressure upon this insulating member and lifting the contact end of the spring 52 so as to open the contacts 53—54 with respect to the corresponding stationary contacts which are in engagement with the portions 50 and 48, respectively, of the split contacts 44 and 45. The shunt, such as shown in Fig. 5, is inserted into the corresponding shunt sockets 44—45 when it is desired that the instrument be used as an ammeter.

Figure 6:
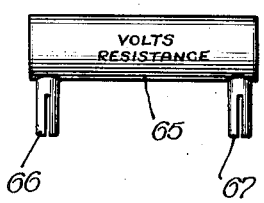

Two additional socket contacts 46 and 47 already mentioned are provided in the instrument, which may be bridged by the series resistance shown in Fig. 6, comprising the resistance body 65 and two prongs 66 and 67. When it is desired that the instrument be used as a voltmeter, the series resistance will be inserted with its prongs in the socket contacts 46—47, bridging the gap across the corresponding lead 75 indicated in Fig. 4.

Only a few of the conductors are indicated in Fig. 2, and all the resistances are omitted from this figure. The instrument may be closed by means of a cover 70, as indicated in Fig. 3.

The description of the electrical equipment may be amplified and the description of the operation of the instrument may be completed with reference to the circuit diagram shown in Fig. 4. It will be seen that the relay 31 is normally connected in a circuit extending in parallel with the moving coil 23 (which operates the indicating hand 26), the moving coil being connected in series with the resistance 73. It may be assumed first that it is desired to use the instrument as a voltmeter. In this case a resistance plug, such as shown in Fig. 6, is inserted to bridge the corresponding socket contacts 46—47, and the circuit to be checked or measured is connected across the leads 40 and 41. Inasmuch as the shunt plug (such as shown in Fig. 5) is not inserted into the corresponding split socket contacts 45 and 44, respectively, the connections across these split contacts will be open. It follows, therefore, that the lead 74 will be inactive. The circuit for the voltage measurement extends under these conditions from the post 40 across the series resistance 65 (bridging socket contacts 46 and 47), conductor 75, to the point 76 where the current will branch, one branch extending over the resistance 72, conductor 77, relay 31, and the other branch extending over the resistance 71, moving coil 23, to the other terminal of the relay 31, and back over resistance 73, fuse 43, closed contact 53 to post 41. The moving coil 23 will be energized and indicates the voltage value on the scale of the instrument according to the measuring range which is determined, as previously mentioned, by the value of the series resistance 65. Should an overload occur, then the relay 31 will become sufficiently energized to actuate its armature 32 to bring down the contact 34 upon the fixed contact 33, thus short-circuiting the moving coil 23 and protecting it against damage. It is understood, of course, that the various circuit connections are shown in diagrammatic representation and that several connections may be placed differently in practice without altering the performance.

If it is desired to use the instrument as an ammeter, it will be necessary to remove the series resistance plug 65, thus opening the conductor from the post 40 to the lead 75, and to insert instead the shunt plug 60 (Fig. 5), by inserting its prongs 61 and 62 into the split socket contacts 44 and 45. The insertion of this shunt plug actuates the contacts 53—54, as previously described, thus removing the normal short circuit across the posts 41—42 and substituting therefor the shunt 60. The circuit to be measured or checked will then be connected across the posts 41 and 42. The contacts controlled by springs 53 and 54 being open, the measuring circuit now extends from the post 41 across the contacts 50—51, which are bridged by the prong 61, fuse 43, resistance 73, moving coil 23, resistances 71 and 72 in parallel with the relay coil 31, conductor 74, split contacts 49 and 48 bridged by the prong 62 of the shunt plug and back to post 42. It will be seen that the conditions with respect to the circuit of the moving coil 23 and the relay 31 are identical with the conditions in the first case; that is, these elements are connected in parallel. When an overload occurs, the relay 31 again becomes sufficiently energized to close the contacts 33—34, short-circuiting the moving coil 23 and thus protecting it against damage.

The relay 31 also improves the damping of the instrument. This is due to the presence of a resistance (relay 31) in parallel with the moving coil and due to the fact that the moving coil is entirely short-circuited at the moment an overload occurs. In addition to the protection against overload afforded by the relay 31, there is provided the fuse 43 which breaks the circuit in the presence of a predetermined heavy load.

Changes may be made, and it is therefore understood that the foregoing description and the structure and arrangement shown in the drawings are only representative, and are not intended to indicate any undue limitations except as defined in the accompanying claims which specify what I believe my invention to be and what I wish to have protected by Letters Patent of the United States.

I claim as my invention:

1. In an electrical measuring instrument of the moving coil type, a generally U-shaped permanent magnet, a moving coil disposed between the ends of the legs of said magnet for electromagnetic coaction therewith responsive to current flow through said moving coil, a relay coil positioned between the legs of said magnet on an axis which is substantially parallel to the axis of said moving coil, means forming connections for normally maintaining said relay coil in a circuit extending parallel with said moving coil so that whenever current flows through the moving coil current will also flow through the relay, said relay being adjusted so as to remain inoperative throughout the normal measuring range of said instrument and to energize operatively when said normal range is exceeded, an armature for said relay disposed alongside said permanent magnet in a plane substantially perpendicular to the axis of said moving coil, and circuit means actuated by said armature upon operative energization of said relay for closing a shunt around said moving coil to prevent excessive current flow therein.

2. The structure defined in claim 1, wherein said last named circuit means comprises a stationary contact and companion contact means carried by said armature, together with journal means for said moving coil, and means connected with said journal means for holding said stationary contact.

3. A unitary self-contained electrical measuring instrument of the moving coil type having a housing containing, in combination, a generally U-shaped permanent magnet, a moving coil disposed between the ends of the legs of said magnet for electromagnetic coaction therewith responsive to current flow through said moving coil, a relay comprising a coil positioned immediately adjacent said permanent magnet, means forming connections for normally maintaining said relay coil in a circuit extending in parallel with said moving coil so that whenever current flows through the moving coil current will also flow through the relay coil, said relay being adjusted so as to remain inoperative throughout the normal measuring range of said instrument and to energize operatively when said normal range is exceeded, an armature for said relay which remains wholly inoperative as long as said relay is inoperative, and circuit means actuated by said armature solely upon operative energization of said relay for closing a shunt around said moving coil to prevent excessive current flow therethrough.

4. The structure defined in claim 3, wherein said relay coil is positioned on an axis which extends substantially parallel to the axis of said moving coil.

5. The structure defined in claim 3, together with means for mounting the armature for said relay alongside said permanent magnet in a plane extending substantially perpendicular to the axis of said moving coil.

6. The structure defined in claim 3, wherein said last named circuit means comprises a contact carried by said armature and a stationary companion contact for coaction therewith, together with journal means for said moving coil, and means connected with said journal means for holding said stationary contact.

ARTHUR R. DOERING.